June 24, 1930.   J. S. FRASER   1,767,660
MUD GUN
Filed May 8, 1929
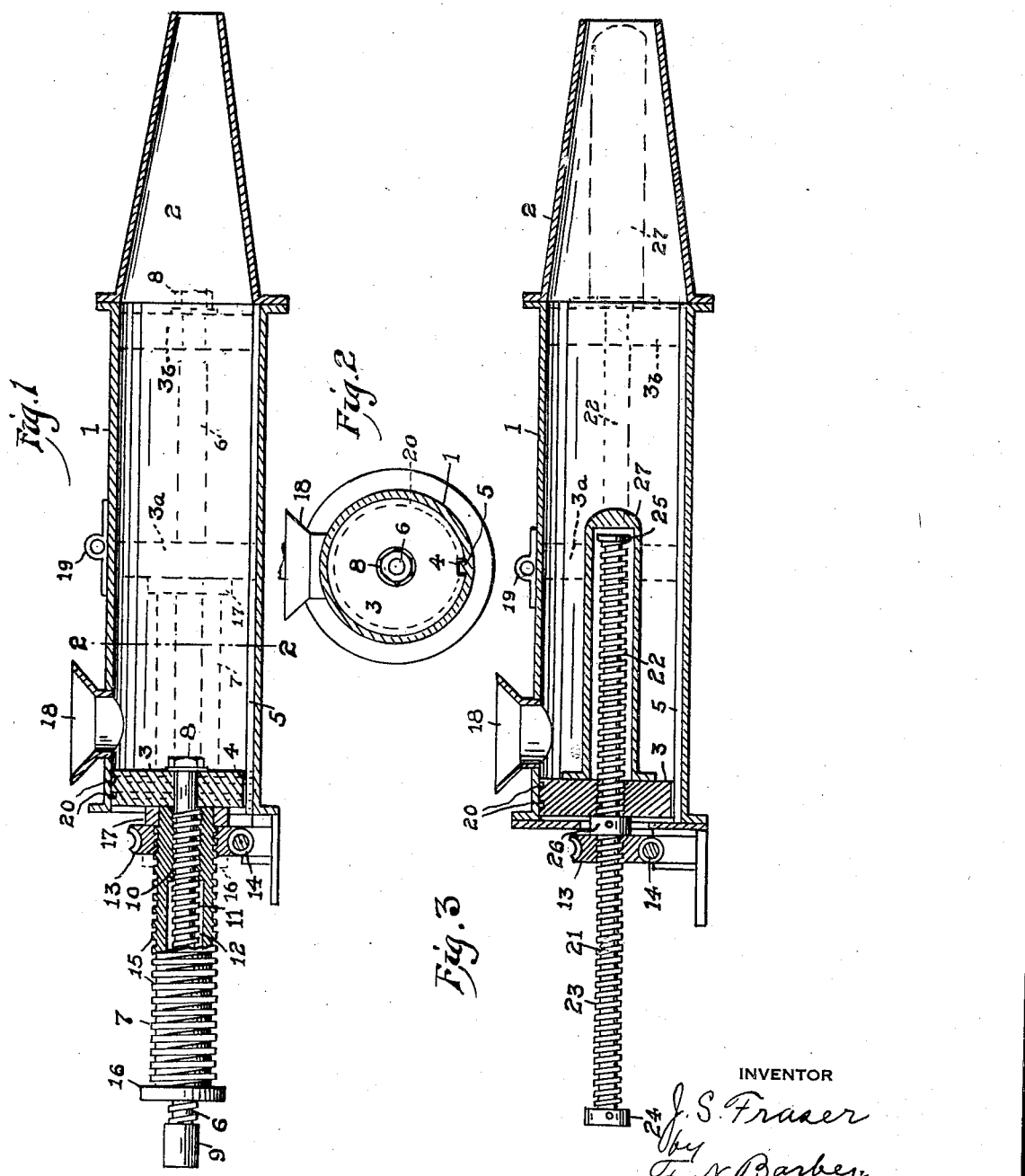
INVENTOR
J. S. Fraser
by F. N. Barber
attorney Patented June 24, 1930

1,767,660

UNITED STATES PATENT OFFICE

JAMES S. FRASER, OF WARREN, OHIO

MUD GUN

Application filed May 8, 1929. Serial No. 361,319.

This invention relates to mud guns for stopping the tapping holes of blast furnaces and the like.

One object of this invention is to provide the piston of a mud gun with a comparatively short travel within the cylinder. Another object is to provide a shield for the parts of the mud gun which travel in front of the piston. Other objects appear hereinafter.

Referring to the accompanying drawing, Fig. 1 is a central longitudinal section of a mud gun provided with my invention, portions of the view being in side elevation; Fig. 2, a transverse section on the line 2—2 on Fig. 1; and Fig. 3, a view like Fig. 1, but showing a modification thereof.

Referring first to Figs. 1 and 2, 1 designates the cylinder of the mud gun and 2 the nozzle attached to the forward end of a cylinder. The piston 3 has travel longitudinally in the cylinder and is prevented from rotation by means of the notch 4 therein which receives the stationary guide strip 5 secured to the bottom of the cylinder. The piston is operated by the compound piston rod which comprises the members 6 and 7. The piston member 6 is a screw having one end secured in the axial center of the piston by the nut 8. The member 6 is threaded from the outer face of the piston nearly to its outer end where it is provided with the head 9. The member 6 is co-axial with the member 7 and extends entirely through it and projects for some distance beyond the outer end of the member 7. The interior of the inner end of the member 7 is provided with screw threads 10 in which the threads 11 of the member 6 work. The interior of the member 7 is provided with the bore 12 which is at least as large as the diameter of the member 6 and may be somewhat larger as shown to receive the head 9 on the outer end of the screw, the diameter of the head being that of the diameter of the bore.

13 is a rotary member acting as a worm wheel which is driven by the worm 14, and as a nut working upon the threads 15 on the periphery of the cylindrical member 7. The member 7 has at its opposite ends the flanges 16 and 17.

18 is a hopper through which mud is fed to the interior of the cylinder 1 in advance of the piston 3 and 19 is an eye to receive a hook or the like supported by a suitable hoisting device.

The piston has its periphery provided with one or more piston rings 20 similar to those on automobile pistons. As shown by the dotted line in Fig. 2, the piston rings have their ends separated and on opposite sides of the guide strip 5.

The parts being as shown and the cylinder and nozzle being supplied with suitable mud, the drive shaft 14 is caused to rotate thereby rotating the rotary member 13. Assuming that the member 7 does not rotate at first, the rotary member 13 will feed the piston and the members 6 and 7 to the right until the piston reaches the position $3^a$, at which time the flange 16 will engage the outer face of the rotary member 13, whereupon the member 7 and the rotary member 13 become locked together. Further rotation of the member 13 will cause the member 7 to rotate with it causing the member 6 and the piston 3 to be moved to the right until the piston reaches the position $3^b$, at which time the head 9 will have engaged the inner end of the bore 12.

To return the piston to the position shown, the worm 14 is rotated in the opposite direction causing the rotary member 13 to move in the opposite direction also.

Assuming that the member 7 does not rotate, the piston and the members 6 and 7 will be moved to the left until the piston reaches the position $3^a$, at which time the flange 17 engages the rotary member 13. The member 7 and the rotary member 13 are now locked together and rotate as a unit, causing the piston and the member 6 to move to the left to the position shown.

Assuming that the parts are as in Fig. 1 and that upon the rotation of the member 13 the member 7 rotates with the member 13, the piston 3 and the member 6 will feed to the right until the piston reaches the position $3^a$, at which time the head 9 engages with the inner end of the bore 12 whereby the members 6 and 7 are locked together. As the member 7 is now prevented from rotating, it is fed by the member 13 to the right until the piston 3 reaches the position $3^b$.

In order to return the parts to their original position, the direction of rotation of the worm 14 and the worm wheel 13 are reversed. Assuming that the member 7 rotates at first, the piston 3 and the member 6 will be moved to the left until the piston reaches the position $3^a$. At this time the piston engages the end of the member 7 and prevents its further rotation. The continued rotation of the rotary member 13 causes the piston and the members 6 and 7 to move to the left until they reach the position shown.

Referring now to Fig. 3, the cylinder 1 is provided with a piston 3 guided on the strip 5 as in Fig. 1. 21 designates a traveling member having the threaded portion 22 within the cylinder 1 and the threaded portion 23 without the cylinder. The rotary device 13 is in the form of a nut in which the threaded portion 23 works. The rotary device 13 is also a worm wheel operated by the drive worm 14. The traveling member 21 has the flanges or collars 24 and 25. The traveling member 21 has the fixed collar or flange 26 intermediate between its ends and between the piston 3 and the rotary device 13.

The parts being as shown on Fig. 3, the worm 14 is caused to rotate the rotary device 13. Assuming that the traveling member 21 does not at first rotate, the traveling member and the piston with its shield 27, which encloses the threaded portion 22 and is secured to the piston, will travel to the right until the piston reaches the position $3^a$. Just at that time the flange 24 engages the rotary device 13 so that the two are clutched together and caused to rotate as a unit. Thereafter the piston will travel on the threaded portion 22 from the position $3^a$ to the position $3^b$. By rotating the rotary device in the opposite direction and assuming that the traveling member does not at first rotate, the piston and the member 21 will travel until the piston reaches the position $3^a$. At this time the flange 26 engages the rotary device 13 so that thereafter the traveling member 21 and the rotary device 13 rotate as a unit, causing the piston to travel to the left on the threaded portion 22 to the positions shown in full lines on Fig. 3.

Assuming that the parts are as in Fig. 3 and that at first the traveling member 21 rotates with the rotary device 13, the piston 3 will be fed along the threaded portion 22 until it reaches the flange 25. As the piston cannot further rotate, the member 21 cannot rotate any longer, and thereafter the rotary device 13 feeds the piston to the right from the position $3^a$ to the position $3^b$.

Assuming that during the first part of the return movement of the piston the rotary device 13 causes the rotation of the member 21, the piston will be fed along the threaded portion 22 until it reaches the flange 26. Thereafter the member 21 cannot rotate and the rotary device causes the piston and the member 21 to travel as a unit to the left until the parts reach the positions shown in full lines.

I claim:

1. In a mud gun, a cylinder, a piston having non-rotary travel therein, a non-rotary screw carried by the piston, a rotary traveling member having longitudinal internal threads to receive the threads on the screw and having also external threads, a non-traveling nut threaded on the said external threads, means for clutching the traveling member to the nut at the limit of travel of the said member in each direction, and means for clutching the piston to the traveling member at the limit of travel of the piston in each direction.

2. In a mud gun, a cylinder, a piston having non-rotary travel therein, a non-rotary screw carried by the piston, a rotary traveling member having longitudinal internal threads to receive the threads on the screw and having also external threads, a non-traveling nut threaded on the said external threads, means for clutching the traveling member to the nut at the limit of travel of the said member in each direction, and means for clutching the piston to the traveling member at the limit of travel of the piston in each direction, the free end of the said screw having a head constituting a part of the last means and adapted to enter a bore in the traveling member.

3. In a mud gun, a traveling member having two threaded portions, a non-rotary piston, operative connecting means between the piston and one threaded portion, a cylinder in which the piston is reciprocable, a rotary device having threaded connection with the other threaded portion of the said member, means for rotating the said device, and means for clutching the said traveling member to the rotary device at the limit of travel of the said member in either direction, and for establishing rigid connection between the piston and the traveling member at the limit of travel of the piston in either direction.

In testimony whereof, I hereunto affix my signature.

JAMES S. FRASER.